April 18, 1961 H. A. HOWELL ET AL 2,980,777
MAGNET CONTROL APPARATUS
Filed May 6, 1959 3 Sheets-Sheet 1
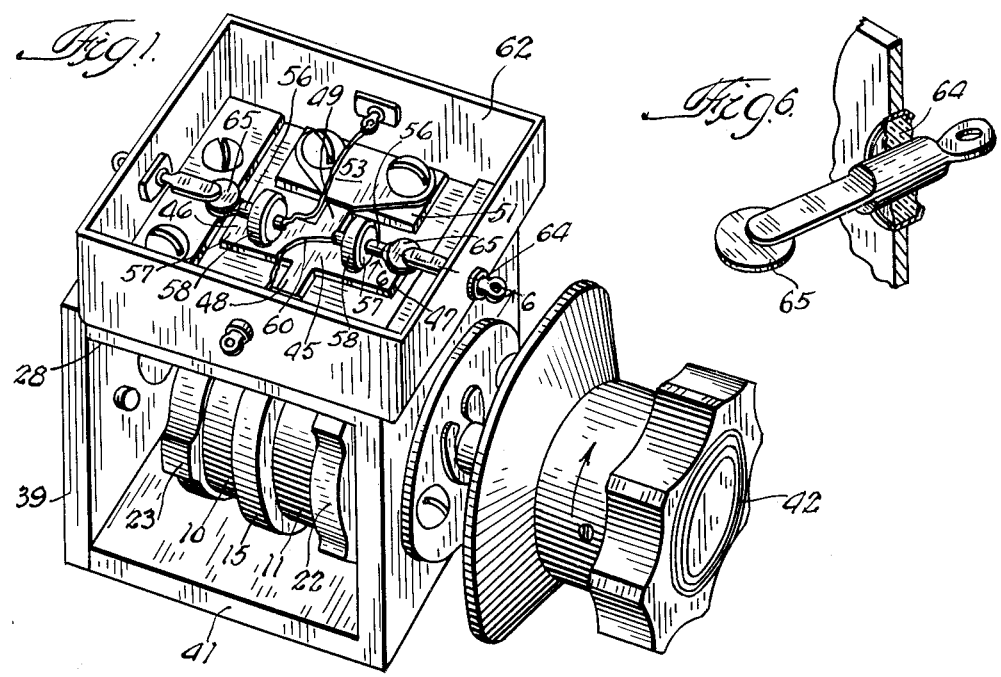
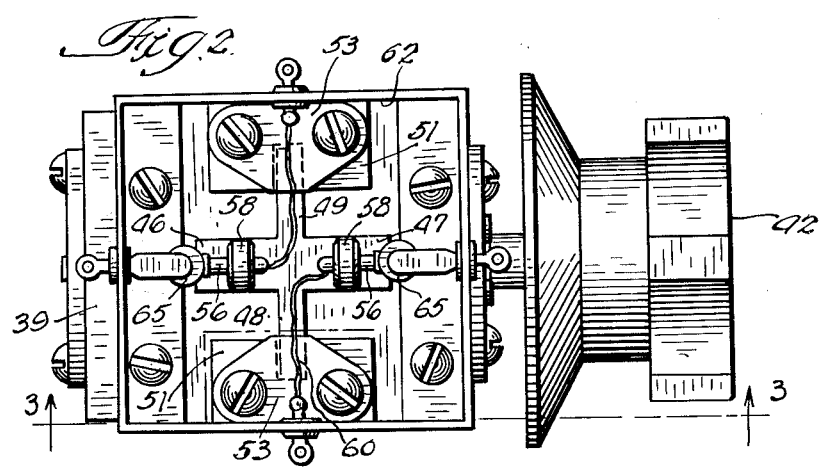
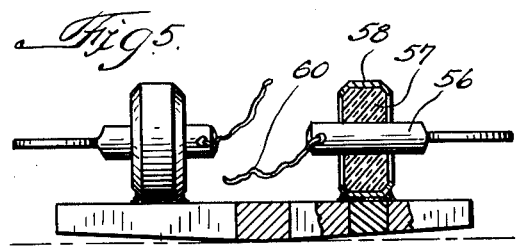
INVENTORS
Hugh A. Howell &
BY Jerry L. Jedd.
Robert L. Kahn

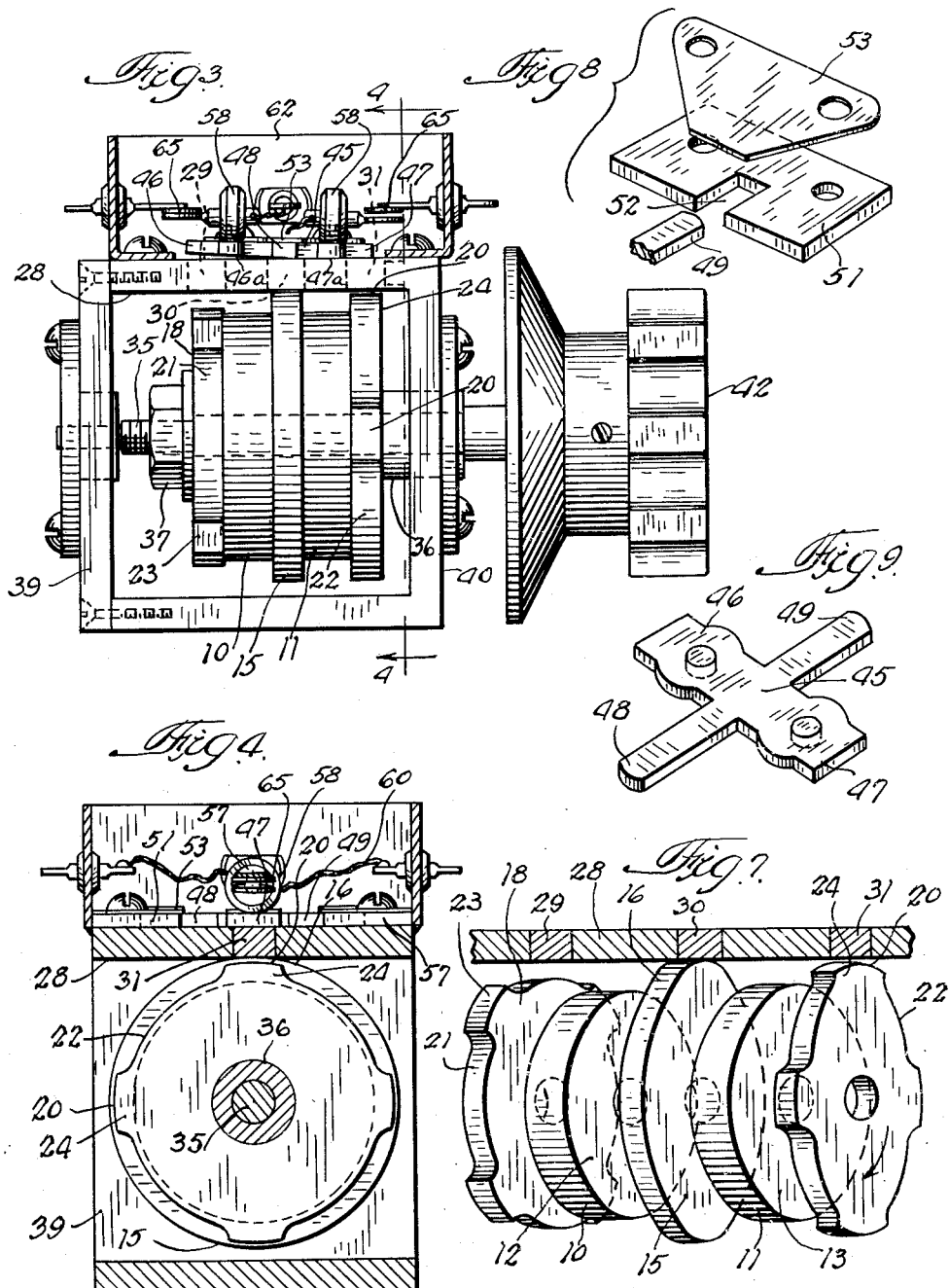

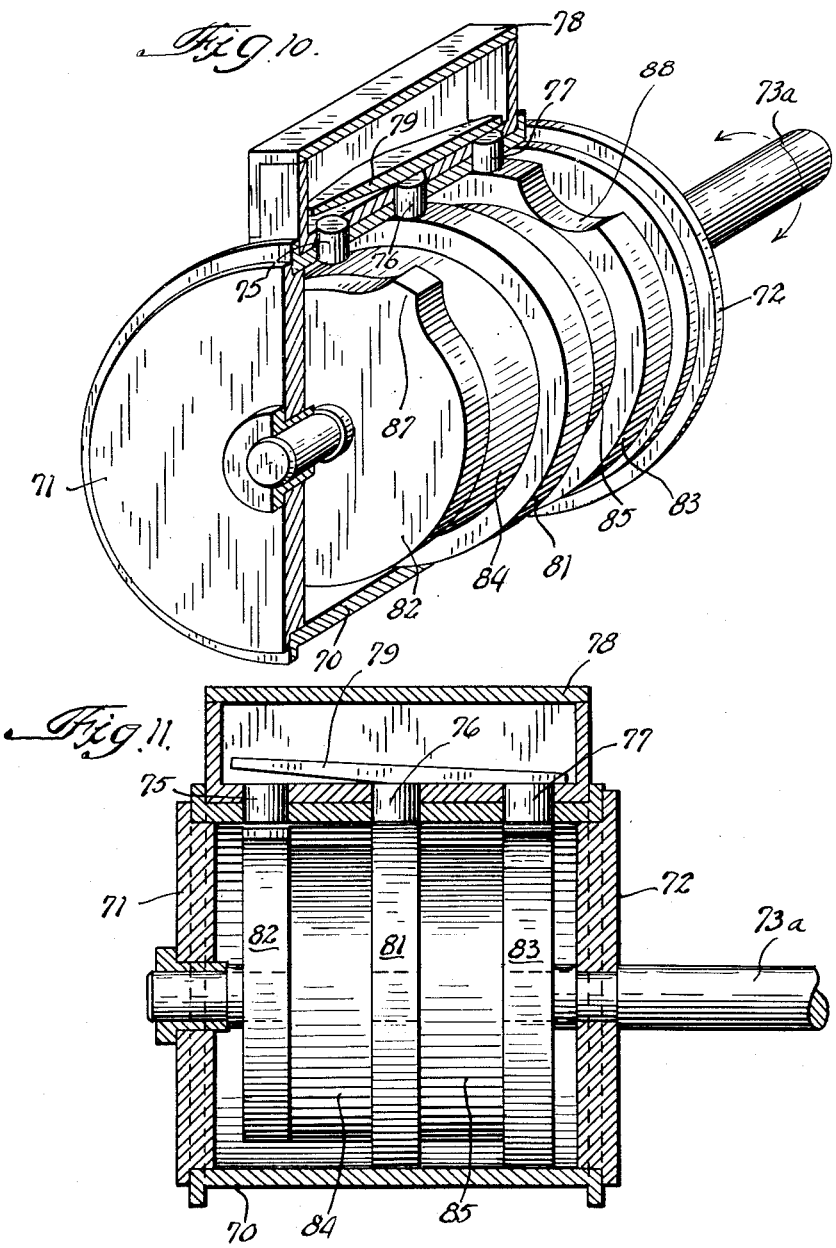

United States Patent Office 2,980,777
Patented Apr. 18, 1961

2,980,777

MAGNET CONTROL APPARATUS

Hugh A. Howell, Berwyn, and Jerry L. Jedd, Arlington Heights, Ill., assignors to Oak Manufacturing Co., a corporation of Delaware Filed May 6, 1959, Ser. No. 811,471

12 Claims. (Cl. 200—87)

This invention relates to a magnet control apparatus and more particularly to a control apparatus utilizing permanent magnets for effecting rapid response of a suitable load, such as one or more electric switches.

The invention disclosed and claimed herein is effective for rotary control movements and is characterized by a simple and rugged construction.

In order that the invention may be understood, reference is made to the drawings wherein—

Figure 1 is a perspective view of one embodiment of the present invention.

Figure 2 is a top view of the structure illustrated in Figure 1.

Figure 3 is a view on line 3—3 of Figure 2.

Figure 4 is a section along line 4—4 of Figure 3.

Figure 5 is a view partly in section illustrating the details of the rocking armature.

Figure 6 is a perspective sectional detail on line 6—6 of Figure 1 showing a contact mounted in the wall.

Figure 7 is an exploded view illustrating the magnet and pole disc parts.

Figures 8 and 9 are perspective details of parts of the structure.

Figure 10 is a perspective view of a modification, certain parts being broken away.

Figure 11 is a sectional elevation of the device shown in Figure 10.

Referring first to Figure 7, permanent magnet discs 10 and 11 are so magnetized that the flat faces, such as 12 and 13, are poles. It is understood that magnet 10 has the two end faces as poles and that magnet 11 has its two end faces as poles. Permanent magnet discs 10 and 11 may be of Alnico V or may be of magnetic oxide ceramic material. Magnets 10 and 11 are in the form of discs and are disposed so that unlike poles are opposite each other. Between magnets 10 and 11 is pole disc 15 of soft iron whose diameter is larger than the diameter of magnet discs 10 and 11.

Pole disc 15 has its periphery 16 smooth. In addition to pole disc 16, additional pole discs 18 and 20 are provided disposed against the outer pole faces of magnets 10 and 11. Pole discs 18 and 20 are generally similar and comprise generally circular body portions 21 and 22 with projecting teeth 23 and 24. Pole disc 18 has, as illustrated here, four projecting pole teeth 23, these being symmetrically disposed around the periphery of body portion 21. Similarly, pole disc 20 has pole teeth 24, four in number, symmetrically disposed around body 22.

The radius of pole teeth 23 and 24 from the center of discs 18 and 20 is substantially equal to the radius of disc 15. The two permanent magnet discs and the three pole discs are clamped together tightly to form a stack as illustrated, for example, in Figures 1 and 3, with end discs 18 and 20 being so arranged that the projecting pole teeth of the two discs are staggered angularly. As seen endwise, one pole tooth 24, for example, might be extending upwardly while pole tooth 23 of the companion disc will be displaced from the vertical by 45 degrees.

Cooperating with this stack of permanent magnet and pole discs is partition 28 having ferromagnetic inserts 29, 30 and 31. Partition 28 is of nonmagnetic material, either metal or nonmetallic. Ferromagnetic inserts 29, 30 and 31 are so arranged that disc 15 may cooperate with ferromagnetic insert 30 while discs 18 and 20 may cooperate respectively with inserts 29 and 31. By cooperation is meant that the entire stack of permanent magnets and pole discs may be rotated. When so rotated, peripheral surface 16 of disc 15 will move past the face of ferromagnetic insert 30. Pole teeth 23 and 24 will move past the faces of ferromagnetic inserts 29 and 31.

Because of the angular stagger of pole teeth 23 and 24, it is clear that when a pole tooth 24 is at the surface of ferromagnetic insert 31, pole teeth 23 will be spaced from ferromagnetic insert 29. With proper design, a substantially all ferromagnetic circuit will be established between ferromagnetic insert 30 on the one hand and ferromagnetic insert 29 or 31 on the other hand depending upon the orientation of the magnet and pole disc stack.

Referring now to Figures 1 to 6, 8 and 9 in the drawing, the permanent magnet and pole piece discs are compacted to form a stack by threading non-magnetic bolt 35 therethrough and having nuts 36 and 37 compress the stack. Bolt 35 is mounted for rotation in end plates 39 and 40 of a housing generally indicated by 41. Bolt 35, which functions as a shaft, carries knob 42 at the end thereof.

While it is preferred to have the walls of housing 41 of non-magnetic material, it is only wall 28 which must be non-magnetic. The remaining walls can be ferromagnetic or not, as desired, and will generally be too far removed to have any effect.

Cooperating with ferromagnetic inserts 29, 30 and 31, is an armature having body 45, contact arms 46 and 47 and support arms 48 and 49.

Referring to Figures 3, 5 and 9, it will be noted that armature 45 has bottom faces 46a and 47a below the contact arms sloping so that the thickness of the armature tapers from a maximum at body 45 to a minimum at the outer ends of arms 46 and 47. The design of the armature is such that arms 46 and 47 can cooperate with ferromagnetic inserts 29 and 31 while body portion 45 can rock against insert 30. If desired, a ball and socket arrangement may be provided for permitting rocking without excessive air gaps under body 45.

Support arms 48 and 49 are maintained in position against the top face of wall 28 by plates 51 having slots 52 for accommodating a support arm. Plates 51 and 52 may be attached to wall 28 by suitable means such as bolts. Cover plates 53 disposed over plates 51 bear down against the top face of the pivot arms of the armature and tend to maintain the armature stable in either of two positions. The nature of plates 51 and 53 is not important. However, if armature 45 is part of the electric circuit to be controlled, then plates 53 may be of metal to serve as contacts bearing on the armature arms.

The armature can carry suitable contacts and in this instance may carry contacts electrically insulated from the armature. Thus, for example, referring to Figure 5, the armature with contact carrying arms 46 and 47 may have provided thereon small movable contacts 56 carried by glass bead 57 in metal sleeve 58 rigidly joined to the armature contact arm. Movable contact 56 is connected by flexible wire 60 to one of a number of terminals carried by a suitable support. For example, housing 62 disposed above partition 28 of housing 41 may be provided. Housing 62 may either be of metal or non-metallic and if of metal may have glass supported terminal 64 secured therein. Certain of the contacts in housing 62 may be connected by flexible wires 60 to the movable contacts on the armature. Other terminals carried by housing 62 will carry stationary contacts 65 for cooperation with the movable contacts supported by the armature.

In any event, the armature is supported in such manner as to be stable in one of two positions and be rockable from one position to the other. Instead of a rockable armature controlling switches, it is possible for the armature to control other devices or mechanisms. However, a fast switch action may be obtained with this arrangement.

If desired, the surfaces of the ferromagnetic inserts which face the pole teeth and pole disc can be ground to conform to the curved surfaces of the discs and pole teeth.

By mounting the assembly accurately and by controlling the tolerances, it is possible to reduce air gaps below partition 28 as seen in Figures 3, 4 and 7, to very small values. By having some lubrication at the ferromagnetic insert surfaces, friction can be reduced to a low value. The direction of rotation of knob 42 is not important. The number of pole teeth from the pole discs can be varied to suit requirements.

It is possible to have additional partitions, similar to 28 at the sides of the housing and at the bottom of the housing. In such case it is understood that end walls 39 and 40 of the housing cannot be used for supporting switch contacts. All other walls of the housing can be used and provided with nonmagnetic partitions with ferromagnetic inserts. Thus, as illustrated here, since discs 18 and 20 have four pole teeth symmetrically disposed, it will be possible to have four housing walls of nonmagnetic material provided with ferromagnetic inserts similar to partition 28 in Figure 7. Thus, as seen in Figure 4, for example, the top and bottom walls and two side walls (not shown in this instance) may be constructed in this fashion. In such case, it is understood that the ferromagnetic inserts will cooperate with the proper parts of the magnetic stack. As many switches can thus be operated as desired. Instead of having a housing which is rectangular as viewed along a line parallel to the axis of the rotor stack, it is possible to have any other geometrical shape including a cylindrical housing. The ferromagnetic insert carrying partition or wall can thus have a generally cylindrical shape or polygonal shape. It is not necessary that the number of ferromagnetic teeth on discs 18 and 20 be an even number or that there be the same number of teeth on the two discs. The only requirement is that only one ferromagnetic tooth be active for any one armature.

It is also possible to have a number of magnet and pole disc stacks in tandem on one operating shaft and control a large number of switches or other devices.

In all cases, it is possible to have the switches hermetically sealed in one or more housings or to have the magnet stack hermetically sealed or to have one hermetically sealed from the other.

While it is preferred to have a north pole of one magnet disc opposite to the south pole of the other magnet disc (these two being separated by pole disc 15), it is possible to have the opposed poles of like polarity. The unlike polarity, however, provides a desirable and efficient magnetic action.

Referring now to Figures 10 and 11, there is illustrated a modification wherein the pole piece discs or members are so shaped that one disc has one projecting tooth for completing a magnetic circuit and the other pole disc has a cut-out portion angularly alined with the tooth of the one member to provide a non-magnetic gap.

Referring specifically to the construction, non-magnetic housing 70 has end plates 71 and 72 in which non-magnetic shaft 73 is journalled. Shaft 73 has handle portion 73a which can be detachably secured to shaft 73. Housing 70 is here illustrated as having a generally cylindrical shape and may be provided with one or more series of longitudinally alined apertures. Into these apertures ferro-magnetic inserts 75 to 77 inclusive may be fitted.

The inserts may be permanently fitted into these apertures or may be slidingly fitted therein. If the latter procedure is adopted, then ferromagnetic inserts 75 to 77 inclusive may be rigidly secured in the bottom wall of auxiliary housing 78 of non-magnetic material. Auxiliary housing 78 has rockable armature 79 and may have suitable switch means such as disclosed, for example, in the other figures actuated by said armature.

Auxiliary housing 78 may be detached from housing 70 and replaced by a different auxiliary housing. It is clear that as many auxiliary housings 78 may be disposed around housing 70 as desired, it being understood that suitable series of apertures for accommodating the ferromagnetic inserts will be provided. It is also possible to have some auxiliary housings permanently attached to housing 70 and others removably disposed.

Within housing 70 and around shaft 73 there will be provided central ferromagnetic pole disc 81 and end ferromagnetic pole discs or members 82 and 83. Between the various pole discs or members there will be permanent magnets 84 and 85. The assembly of permanent magnets and pole members will generally be similar to that previously described except for the shape of the end pole members.

Referring to pole disc or member 83, this has one laterally projecting pole tooth 87, the remainder of the pole member being undercut. Thus, pole tooth 87 is so dimensioned as to substantially contact the inside surface of a cooperating ferromagnetic insert, 75 in this instance.

The other end ferromagnetic pole disc or member 83 is provided with undercut portion 88, the remainder of the pole member being so dimensioned as to substantially contact the inside surface of the cooperating ferromagnetic insert, in this instance 77. It will be clear that as shaft 73 is turned, central pole disc 81 will at all times be substantially in contact with its cooperating ferromagnetic insert 76. End ferromagnetic pole discs 82 and 83 are so oriented that tooth 87 and undercut portion 88 are in alinement. Thus, for a desired angular part of a disc, tooth 87 will be effective to pull armature 79 down against ferromagnetic insert 75. For the remainder pole disc 83 will be effective to rock armature 79 to the position illustrated in Figure 11.

It is understood that housing 70 may have ferromagnetic inserts permanently disposed therein to provide a tight construction or auxiliary housing 78 may be similarly constructed to provide hermetically sealed switches.

What is claimed is:

1. A control mechanism comprising a stack assembly having an axis about which said assembly is movable, said assembly having in succession along the axis thereof a first ferromagnetic pole member followed by a first permanent magnet followed by a ferromagnetic pole piece followed by a second permanent magnet followed by a second ferromagnetic pole member, the permanent magnets being polarized so that their pole faces are disposed against the ferromagnetic bodies on each side thereof, the assembly having magnetic lines of force in said permanent magnets extending generally parallel to the axis and going into the ferromagnetic bodies at the ends and center of the stack, said ferromagnetic pole piece having a smooth curved surface symmetrical about the axis of the assembly, said ferromagnetic pole members having teeth extending laterally from the axis to provide active portions, armature means which in plan view extends parallel to the stack axis, said armature means having three ferromagnetic portions spaced along the stack axis to correspond with the axial spacing of the pole piece and pole members, the teeth on one pole member being angularly staggered with respect to the teeth on the other pole member, the three ferromagnetic portions being disposed so that the pole piece wil in all positions bear against one ferromagnetic portion; and a tooth from one or the other pole member, depending upon the rotary position of the assembly, will bear against the cooperating ferromagnetic portions, the magnetic field intensity being much larger between a center ferromagnetic portion and that end ferromagnetic portion against which a tooth happens to be bearing, said armature being movable in response to changes in magnetic flux distribution and load means operated by said armature means.

2. The control mechanism according to claim 1 wherein said armature means includes a ferromagnetic member having ferromagnetic means for maintaining at all times a ferromagnetic path between the pole piece and said ferromagnetic member, means for mounting said ferromagnetic member so that it can be rocked, said ferromagnetic member having other portions which can cooperate with the proper teeth of the first and second ferromagnetic pole members, said ferromagnetic member being rockable from one position where one portion thereof has a ferromagnetic path to the proper tooth of the first pole member, said ferromagnetic member having the other portion which in the other position can provide a ferromagnetic path to the proper tooth of the second ferromagnetic pole member, the ferromagnetic member cooperating with only one tooth at any one time so that as said assembly is turned, said ferromagnetic member can be rocked from one position to the other as desired.

3. A control mechanism comprising a stack assembly having an axis about which said assembly is movable, said assembly having in succession along the axis thereof a first ferromagnetic pole member followed by a first permanent magnet followed by a ferromagnetic pole piece followed by a second permanent magnet followed by a second ferromagnetic pole member, the permanent magnets being polarized so that their pole faces are disposed against the ferromagnetic bodies on each side thereof, the assembly having magnetic lines of force in said permanent magnets extending generally parallel to the axis and going into the ferromagnetic bodies at the ends and center of the assembly, said ferromagnetic pole piece having a smooth curved surface symmetrical about the axis of the assembly, said ferromagnetic pole members having teeth extending laterally from the axis to provide active portions, a supporting wall structure which is fixed relative to the stack assembly, said wall structure being generally of rigid nonmagnetic material with one side of the wall facing the stack assembly and the other side of the wall being away from the stack assembly, said wall structure having at least one active wall portion which, in plan view, extends generally parallel to the stack axis, said active wall portion having three ferromagnetic inserts extending through said wall from one side to the other, the end and intermediate inserts being spaced along the stack axis to correspond with the axial spacing of the pole teeth and pole piece, the teeth on one pole member being angularly staggered with respect to the teeth on the other pole member, the active wall portion being disposed so that the pole piece will in all positions bear against its cooperating insert and a tooth from one or the other pole member, depending upon the rotary position of the assembly, will bear against the cooperating end insert, armature means on the active wall portion at the outer side thereof for cooperating with the three inserts for responding to the magnetic activation of an end insert, the magnetic field intensity being much larger between a center insert and that end insert against which a tooth happens to be bearing so that armature movement may be provided with respect to one or the other of the end inserts and a load controlled by the movement of said armature means.

4. The construction according to claim 3 wherein said armature means includes an elongated ferromagnetic member having a midportion disposed against the central insert at all times, said ferromagnetic member having end portions which can bear against one or the other end insert depending upon the position to which said member is rocked.

5. The construction according to claim 4 wherein said load comprises at least one electric switch.

6. A control mechanism comprising a stack assembly having an axis about which said assembly can be turned, said assembly having in successive arrangement along the axis a first ferromagnetic pole member followed by a first permanent magnet followed by a center ferromagnetic pole disc followed by a second permanent magnet followed by a second ferromagnetic pole member, said pole members, magnets and disc being symmetrical with respect to the assembly axis and having the pole disc generally perpendicular to the axis, said pole members having teeth extending laterally from the axis, the permanent magnets providing lines of magnetic force extending generally parallel to the assembly axis and, at the ferromagnetic pole members and disc, said lines extend away from the axis, a supporting wall structure which is fixed relative to the stack assembly, said wall structure being of rigid nonmagnetic material with one wall side facing the stack assembly and the other wall side away from the stack assembly, said wall structure having at least one active wall portion which when viewed in plan extends generally parallel to the stack axis, said active wall portion having three ferromagnetic inserts extending through said wall from one side to the other, the inserts being spaced along the stack axis to correspond with the axial spacing of the pole disc and pole teeth, the end inserts cooperating with the pole teeth and the intermediate insert cooperating with the disc, the active wall portion being disposed so that the pole disc will at all times have the periphery thereof bearing against its cooperating central insert and a tooth from one or the other pole members can bear against the cooperating end insert, the pole members being angularly staggered so that no more than one tooth of one or the other pole members will be active against an end insert, the remaining pole teeth being inactive for that particular assembly position, said assembly being movable around its axis so that a tooth from one or the other pole member becomes successively active with its corresponding ferromagnetic insert, armature means disposed on the outer side of the active wall portion for cooperation with a central insert and one or the other end inserts and a load controlled by the movement of said armature means for utilizing the change in magnetic condition of said mechanism.

7. The construction according to claim 6 wherein said armature means includes an elongated ferromagnetic member rockably mounted at the intermediate insert and having end portions which can contact one or the other end insert, depending upon the rocking of the member.

8. The construction according to claim 7 wherein said load comprises at least one electric switch.

9. A control mechanism comprising a stack assembly having an axis about which said assembly is movable, said assembly having in succession along the axis thereof a first ferromagnetic pole member followed by a first permanent magnet followed by a ferromagnetic pole piece followed by a second permanent magnet followed by a second ferromagnetic pole member, the permanent magnets being polarized so that their pole faces are disposed against the ferromagnetic bodies on each side thereof, the assembly having magnetic lines of force in said permanent magnets extending generally parallel to the axis and going into the ferromagnetic bodies at the ends and center of the stack, said ferromagnetic pole piece having a smooth curved surface symmetrical about the axis of the assembly, one ferromagnetic pole member having at least one tooth extending laterally from the axis, the other ferromagnetic pole member having a generally disc-shaped body with at least one portion thereof undercut, the tooth of one pole member being alined with respect to the undercut portion of the other pole member, means including an armature having three portions in alinement along a line parallel to the assembly axis, the three ferromagnetic pole members being disposed so that the pole piece will in all positions complete a ferromagnetic circuit to the central armature portion, the tooth from one member being adapted to complete a ferromagnetic circuit to an end armature portion, while the undercut portion from the other member provides a non-magnetic gap at the remaining end armature portion depending upon the rotary position of the assembly, in a different rotary position of the assembly the magnetic circuit conditions being reversed insofar as non-magnetic gaps are concerned, said device being adapted to operate with an armature which is movable in response to changes in magnetic flux distribution.

10. A control mechanism comprising a stack assembly having an axis about which said assembly is movable, said assembly having in succession along the axis thereof a first ferromagnetic pole disc followed by a first permanent magnet disc followed by a ferromagnetic pole piece disc followed by a second permanent magnet disc followed by a second ferromagnetic pole disc, the permanent magnets being polarized so that their pole faces are opposite disc faces against the ferromagnetic bodies on each side thereof, the assembly having magnetic lines of force in said permanent magnets extending generally parallel to the axis and going into the ferromagnetic discs at the ends and center of the stack, said ferromagnetic pole piece having a smooth curved surface symmetrical about the axis of the assembly, one ferromagnetic pole disc having at least one tooth extending laterally from the axis, the other ferromagnetic pole disc having at least one portion thereof undercut, the tooth of one pole disc being alined with respect to the undercut portion of the other pole disc, a non-magnetic support having at least one series of ferromagnetic inserts in longitudinal alinement offset from the assembly axis, the three ferromagnetic discs being disposed so that they will in all positions register with the inserts, discs being so dimensioned that the center disc will always bear against the cooperating insert, one disc will have the tooth long enough to bear against its cooperative insert, the remaining end disc reaching the cooperating insert except for an undercut portion, and armature means responsive to changes in magnetic flux conditions in the end inserts.

11. The construction according to claim 10 wherein said stack assembly is disposed in a non-magnetic housing and wherein a separate non-magnetic housing containing a rockable armature is provided, said separate housing including said ferromagnetic inserts adapted to fit into apertures in said stack housing.

12. The construction according to claim 10 wherein said one pole disc has only one active tooth portion with the rest of the pole member being undercut and wherein the other pole disc has only one undercut portion.

References Cited in the file of this patent
UNITED STATES PATENTS

| | | |
|---|---|---|
| 2,827,531 | O'Brien | Mar. 18, 1958 |
| 2,853,576 | Tigerschiold | Sept. 23, 1958 |